1923B2

(12) United States Patent
Okochi et al.

(10) Patent No.: US 8,231,923 B2
(45) Date of Patent: Jul. 31, 2012

(54) OILY FOOD MATERIAL

(75) Inventors: Masako Okochi, Tsukubamirai (JP);
Masayuki Matsui, Tsukubamirai (JP);
Hideki Komai, Tsukubamirai (JP)

(73) Assignee: Fuji Oil Company, Limited, Osaka (JP)

( * ) Notice: Subject to any disclaimer, the term of this patent is extended or adjusted under 35 U.S.C. 154(b) by 1317 days.

(21) Appl. No.: 11/795,559

(22) PCT Filed: Jan. 27, 2006

(86) PCT No.: PCT/JP2006/301280
§ 371 (c)(1),
(2), (4) Date: Sep. 24, 2007

(87) PCT Pub. No.: WO2006/080418
PCT Pub. Date: Aug. 3, 2006

(65) Prior Publication Data
US 2008/0089995 A1 Apr. 17, 2008

(30) Foreign Application Priority Data

Jan. 27, 2005 (JP) .................................. 2005-019758

(51) Int. Cl.
*A23G 1/00* (2006.01)
(52) U.S. Cl. ........... 426/613; 426/99; 426/631; 426/660
(58) Field of Classification Search .................. 426/613, 426/98, 99, 302, 303, 306, 630, 660
See application file for complete search history.

(56) References Cited

U.S. PATENT DOCUMENTS

| | | | | |
|---|---|---|---|---|
| 3,551,166 | A * | 12/1970 | Baum et al. | 426/98 |
| 3,698,917 | A * | 10/1972 | Baum et al. | 426/285 |
| 4,910,037 | A * | 3/1990 | Sagi et al. | 426/601 |
| 5,023,101 | A * | 6/1991 | Sugihara et al. | 426/603 |
| 5,718,938 | A * | 2/1998 | Cain et al. | 426/549 |
| 5,766,659 | A * | 6/1998 | Asama et al. | 426/1 |
| 6,312,751 | B1 * | 11/2001 | Cain et al. | 426/607 |
| 6,576,287 | B2 * | 6/2003 | Miller et al. | 426/650 |
| 6,599,549 | B1 * | 7/2003 | Kuffel et al. | 426/549 |
| 7,435,441 | B2 * | 10/2008 | Hashizume et al. | 426/606 |

FOREIGN PATENT DOCUMENTS

| | | | |
|---|---|---|---|
| GB | 1 431 781 | | 4/1976 |
| GB | 2168715 | * | 6/1986 |
| JP | 49-9507 | | 1/1974 |
| JP | 11-113494 | | 4/1994 |
| JP | 9-316484 | | 12/1997 |

OTHER PUBLICATIONS

Swern, D. 1979. Bailey's Industrial Oil and Fat Products, vol. 1, $4^{th}$ edition. John Wiley & Sons, New York. p. 325.*
Minifie, B. W. 1980. Chocolate, Cocoa and Confectionery: Science and Technology, $2^{nd}$ edition. AVI Publishing Company, Inc., Westport, CT. p. 59, 69, 107, 112, 113, 650.*
Ulberth, F. 2003. Eur. J. Lipid Sci. Technol 105:32.*
Minifie, Bernard. 1980. Chocolate, Cocoa and Confectionery: Science and Technology, $2^{nd}$ edition. AVI Publishing Company, Westport, CT. p. 25, 107, 117.*
Beckett, S. T. 1988. Blackie Academic & Professional, New York. p. 277.*
Matz, S. 1976. Snack Food Technology. The AVI Publishing Company, Inc., Westport, CT. p. 30.*
Gould, W. A. 1995. Glossary for the Food Industries, $2^{nd}$ edition. CTI Publications, Inc. Baltimore, MD. p. 173.*
G. Hogenbirk, "Compatibility of Specialty Fats with Cocoa Butter", The Manufacturing Confectioner, vol. 5, pp. 59-64, Jun. 1984.
T. Arishima et al., "Applications of Specialty Fats and Oils", The Manufacturing Confectioner, pp. 65-76, Jun. 2002.
Office Action dated Sep. 25, 2009 issued in the corresponding Chinese Patent Application No. 200680010115.2 with its English translation.
Chinese Office Action issued Jan. 11, 2011 in corresponding Chinese Patent Application No. 200680010115.2 (with English translation).

* cited by examiner

*Primary Examiner* — Carolyn Paden
(74) *Attorney, Agent, or Firm* — Wenderoth, Lind & Ponack, L.L.P.

(57) ABSTRACT

[PROBLEMS] To develop by an easy method an oily food material which, when eaten, gives a satisfactory and novel feeling in the mouth and which has high heat resistance.
[MEANS FOR SOLVING PROBLEMS] In the oily food material, the particle size of solid ingredients other than the fat is kept at 30 µm or more, which is larger than in ordinary oily food materials represented by chocolate, and the proportion of StUSt to all fat is regulated to 30 wt % or higher. Furthermore, the fat content in the oily food material is 20-55%. Due to this constitution, the oily food material has significantly improved meltability in the mouth while retaining high heat resistance. It can be produced by an easy method.

17 Claims, No Drawings

OILY FOOD MATERIAL

This application is a U.S. national stage of International Application No. PCT/JP2006/301280 filed Jan. 27, 2006.

TECHNICAL FIELD

The present invention relates to an oily food material having high heat resistance while possessing peculiar meltability in the mouth and a novel texture, which is obtained by increasing the proportion of particular TG composition in an oily food material and adjusting the proportion of particles having a particular particle size in an oily food material to a particular proportion.

BACKGROUND ART

There is traditionally much demand for oily foods represented by chocolate in the market, and recently there are a variety of oily foods for meeting marketing needs that accompany diversification of tastes. In particular, there is a high demand for an oily food having good meltability in the mouth and a novel texture in the market.

On the other hand, in an oily food, generally, when meltability in the mouth is improved, heat resistance is decreased. Therefore, for recent merchandise which may be frequently exposed to variable temperatures and environments in a distribution process, it is important to have stronger resistance to heat as well as good meltability in the mouth.

A representative fat for chocolate is mainly cocoa butter. A chocolate containing much cocoa butter is rapidly softened or deformed at a high temperature of 28° C. or more, and thereby its commercial value is remarkably decreased.

For this reason, various attempts to improve the heat resistance of an oily food have ever been made and, inter alia, a method of modifying a fat has been generally used frequently.

Fat contains triacylglycerols (hereinafter, referred to as TG) as the main component and, inter alia, cocoa butter contains symmetric TGs as the main component. A symmetric TG refers to a TG in which saturated fatty acids are bound to the 1,3-positions and an unsaturated fatty acid is bound to the 2-position, and when a large amount of symmetric TGs are contained in a fat, an oily food having good meltability in the mouth is obtained by performing solidification of the fat under strict temperature control and manipulation (said temperature manipulation is called "tempering", and a fat containing a large amount of symmetric TGs which requires such a tempering procedure is referred to as a "tempering-type fat").

Of such a type of oily foods, the most common oily food is a chocolate which contains cocoa butter as the main raw material. Cocoa butter contains symmetric TGs, particularly, 1,3-distearoyl-2-oleoyl-glycerol (hereinafter, referred to as StOSt), 1,3-dipalmitoyl-glycerol (hereinafter, referred to as POP) and 2-oleoyl-stearoylpalmitoylglycerol (hereinafter, referred to as POS) in large amounts. Among symmetric triglycerides which are the main component of cocoa butter, a TG having the highest melting point is StOSt (1,3-distearoyl-2-oleoylglycerin). A method of increasing the heat resistance of an oily food which comprises adding a fat rich in StOSt has been widely used (see, for example, Gerard Hogenbirk, "Compatibility of Specialty Fats with Cocoa Butter", The Manufacturing Confectioner, 1984 (5), pp. 59-64, Toshiharu Arishima, "Applications of Specialty fats and Oils", The Manufacturing Confectioner, June 2002, pp. 65-76, JP-A 49-9507, pp. 1-33).

When the content of StOSt in a fat is increased to heighten the melting point, the heat resistance is increased, and however, at the same time, the meltability of the fat in the mouth is greatly deteriorated. Particularly, since a chocolate containing a large amount of symmetric TGs gains excellent taste and meltability in the mouth via solidification under strict temperature manipulation (tempering), it is not desirable that the valuable meltability in the mouth is sacrificed for increase in heat resistance.

Thus, in the market, there is a strong need for a method of increasing heat resistance and minimizing deterioration in the meltability in the mouth of an oily food.

DISCLOSURE OF INVENTION

Problems to be Solved by the Invention

An objective of the present invention is to develop an oily food material having a satisfactory and novel texture which conventional oily food materials have never had and having high heat resistance by an easy method.

Means for Solving the Problems

In order to attain the objective, the present inventors intensively studied and, as a result, found that an oily food material having high heat resistance and significantly improved meltability in the mouth can be produced by an easy method which comprises maintaining the particle size of solid ingredients other than fat in the oily food material at a larger size than that in normal oily food materials represented by chocolate, adjusting the proportion of SUS in the total fat amount contained in the oily food material to a particular proportion or more, and adjusting the fat content in the oily food material to a particular range. Finally the present invention was completed.

That is, the present invention provides
(1) an oily food material comprising a fat and a sugar as the main ingredients, wherein coarse particles of solid matter other than the fat have a particle size of 30 µm or larger, and the proportion of SUS in the total fat amount contained in the oily food material is 30% or more (wherein S is a saturated fatty acid having 18 or more carbon atoms and U is an unsaturated fatty acid); and
(2) the oily food material according to the above (1), which contains the fat in an amount of 20% to 55% of the oily food material.

EFFECT OF THE INVENTION

The present invention has an advantage that an oily food material having a satisfactory and novel texture which conventional oily food materials have never had and having high heat resistance can be produced by an easy method.

BEST MODE FOR CARRYING OUT THE INVENTION

The present invention will be explained in more detail below. The oily food as referred in the present invention is not particularly limited as long as it is a food in which a fat forms a continuous phase, and examples thereof include a chocolate, a chocolate-like food, and a glaze.

The oily food is composed of a fat and solid matter other than the fat, and the solid matter other than the fat is composed of sugar and solid matter other than the fat and the sugar.

In the oily food material as referred in the present invention, solid matter other than fat contained in the oily food has a particle size of 1 mm as the upper limit or smaller.

Examples of the oily food include an oily food in which edible substances (e.g. puffs and nuts) having a particle diameter exceeding 1 mm are dispersed, and an oily food prepared by coating or revolving edible substances having a particle diameter exceeding 1 mm with an oily food material. An extreme example thereof includes an oily food prepared by binding edible substances having a particle size of a few mm to a few cm to each other using an oily food material as a "binder" (e.g. "chocolate balls" prepared by coating peanuts with chocolate, and a "nut bar" prepared by binding roughly ground nuts to each other with an oily food material).

However, solid matter other than fat which has a particle diameter exceeding 1 mm is recognized as a different food from an oily food material itself in the mouth, and therefore does not contribute to improvement in the meltability feeling in the mouth, which is an objective of the present invention.

Thus, in the present invention, if edible substances having a particle diameter exceeding 1 mm are contained in an oily food, the edible substances are not regarded as solid matter of an oily food material. The solid matter of an oily food material is defined by having a particle diameter of 1 mm or smaller.

The solid matter other than fat contained in the oily food material desirably comprises coarse particles having a particle size of 30 μm or larger. When the particle size of the solid matter other than fat is smaller than 30 μm, the heat resistance of the oily food material is maintained, but the meltability feeling of the oily food material in the mouth is deteriorated.

The sugar used in the oily food material is not particularly limited, and examples thereof include sucrose, maltose, glucose, powdered starch syrup, fructose, lactose, trehalose, powdered maltose and the like.

Examples of the solid matter other than the fat and the sugar used in the oily food material of the present invention include milk products such as whole milk powder, skim milk powder, cream powder, whey powder, butter milk powder and the like, cacao matter such as cocoa mass, cocoa powder, adjusted cocoa powder and the like, cheese powder, coffee powder, fruit juice powder and the like.

Apart from the objective of the present invention, an oily food material containing 20% to 30% of fat is not suitable for manual coating because of its viscosity or the like, but can be used for mechanical coating or for making a shell by using a device.

The TG composition of the oily food material of the present invention desirably comprises SUS (wherein S indicates a saturated fatty acid having 18 or more carbon atoms, and U indicates an unsaturated fatty acid) in an amount of 30 wt % or more of the total fat amount contained in the oily food material. The saturated fatty acid of S is preferably stearic acid (St) having a carbon number of 18. The unsaturated fatty acid corresponding to U is preferably oleic acid (O) of which carbon number is 18 and unsaturated bond number is 1. That is, it is desirable that the TG composition comprises StOSt as SUS in an amount of preferably 30 wt % or more, more preferably 40% or more of the total fat amount contained in the oily food material. When the amount of SUS contained in the oily food material is less than 30%, the meltability feeling of the oily food material in the mouth is good, but the heat resistance imparted to the oily food material is insufficient.

As a raw material, any fat may be used as long as the fat meets the above definition. Examples of the fat include vegetable fats and oils such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, sal fat, cacao butter, coconut butter, palm kernel oil and the like; animal fats and oils such as cream, beef tallow, lard, fish oil, whale oil and the like; and processed fats and oils obtained by subjecting these fats and oils to hardening, fractionation, transesterification or the like.

The fat content is desirably 20 to 55 wt % of the whole oily food material. When the fat content is less than 20%, it is difficult to make an oily food material. When the fat content exceed 55 wt %, the meltability of the obtained oily food material in the mouth is significantly deteriorated, resulting in waxy texture.

As a process for producing the oily food material of the present invention, all raw materials may be melted and mixed at one time. However, when a part of melted fat is added afterwards, the dispersibility of the fat is increased. If necessary, a coloring agent, an emulsifier, and a flavor are added to the mixture. In the paste-like mixed dispersion thus obtained, coarse particles of solid matter other than fat contained therein are adjusted to a particle diameter of 30 μm or larger, preferably 45 μm or larger, more preferably 55 μm or larger. When the solid matter is finely-divided too much, the heat resistance of the obtained oily food material is maintained, but the meltability feeling of the obtained oily food material in the mouth is deteriorated.

Thus, according to the present invention, an oily food material having a satisfactory and novel texture which conventional oily food materials have never had and having high heat resistance can be produced by an easy method.

EXAMPLES

The present invention will be explained in more detail below by way of Examples, but a spirit of the present invention is not limited by the following Examples. In Examples, % and part are based on weight.

Example 1, Example 2, Example 3, Example 4, Comparative Example 1

Using powdered sugar, a test fat, strawberry powder and lecithin according to the blending ratio shown in Table 1, an oily food material was produced by the following method. The produced oily food material was subjected to a tempering procedure. After tempering, the oily food material was molded and cooled to be solidified.

(Production Method)

In Example 1, 20 parts of a test fat melted at 60° C. was homogenously mixed with 60 parts of powdered sugar (particle size: 70 to 150 μm) and 1 part of strawberry powder by using a mixer to obtain a paste-like mixture, and then, the remaining test fat melted at 60° C. and lecithin were added to the mixture, followed by mixing. In Example 2, Example 3, Example 4 and Comparative Example 1, a part of the test fat melted at 60° C. in such an amount that the oil content of a mixture became 24% was blended with 60 parts of powdered sugar (particle size: 70 to 150 μm) and 1 part of strawberry powder, and the mixture was warmed, kneaded, and milled with a roll refiner ("Three-roll mill SDY-300" manufactured by BUHLER) to obtain an oily food material. The oily food material was milled under such a condition that the particle diameter of the oily food material became 70 μm in Example 2, 50 μm in Example 3, 30 μm in Example 4 or 25 μm in Comparative Example 1 to obtain rolled flakes. The all remaining amount of the test fat and the rolled flakes were kneaded with a conching machine (conche) while warming.

When a population of particles having plural particle size distributions is kneaded and the particles are dispersed in a continuous phase of a fat, it is difficult to measure the particle size distribution as an oil food material, and this is not practical in controlling products. Therefore, for defining a particle size in the present invention, the particle size was measured using a micrometer, which has been relatively generally used by makers of oily food materials.

More specifically, a melted oily food material (diluted with a liquid oil to an oil content of 50% or more) is allowed to adhere to the measuring surfaces of a micrometer (trade name "Digimatic Standard External Micrometer MDC-M" manufactured by Mitutoyo Corporation), and the measuring surfaces are brought closer to each other.

The adhesion amount of the oily food material is such an extent that a part of the oily food material is protruded from the measuring surfaces when the distance between the measuring surfaces of the micrometer is narrowed at measurement and then, a measured value is indicated. The measurement is performed using the oily food material at least in such an amount that the material can be uniformly distributed on the measuring surfaces.

When the adhesion amount is small, a sufficient amount of particles are not present in a gap between the measuring surfaces, and therefore a measurement error is easily produced. Thus, a measurement value is not used when a part of the oily food material is not protruded from the measuring surfaces.

After measurement, the measuring surfaces are cleaned, and then, the measurement is performed again five times by the similar procedure. The average of three measured values excepting the maximum and minimum values was adopted as the particle size of the oily food material.

A fat having an increased content of SOS which is used for the purpose of imparting heat resistance to a tempering-type oily food material (product name "Melano SS400", manufactured by Fuji Oil Co., Ltd.) was used as the test fat. The SOS contents in the test fat and cocoa butter are shown in Table 2.

TABLE 1

| Powdered sugar | 60 parts |
|---|---|
| Test fat | 40 parts |
| Strawberry powder | 1 part |
| Lecithin | 0.4 parts |

TABLE 2

|  | Melano SS400 | Cocoa butter (Ivory) |
|---|---|---|
| SOS content (%) | 64.2 | 25.7 |

Physical property assessment and organoleptical assessment are shown in Table 3.

TABLE 3

|  | Example 1 | Example 2 | Example 3 | Example 4 | Comparative Example 1 |
|---|---|---|---|---|---|
| Particle diameter (μm) | 103 | 70 | 51 | 30 | 24 |
| SOS content (%) | 64.2 | 64.2 | 64.2 | 64.2 | 64.2 |
| <Physical property assessment> | | | | | |
| Heat resistance (° C.) | 33 | 33 | 33 | 33 | 33 |
| <Organoleptical assessment> | | | | | |
| Meltability feeling in the mouth | +++ | +++ | ++ | + | X |

For assessing physical property, a sample was aged at 20° C. about for 7 days after cooling, allowed to stand for 2 hours under each temperature atmosphere, and then measured with RHEO METER (NRM-2003J manufactured by Fudo Kogyo; plunger diameter: 3 mm). The temperature at which a measured value was around 100 gf was regarded as a criterion for heat resistance, and the indication thereof was used as an index of heat resistance (provided that since the measurement was performed at intervals of one degree, the index was presumed from indications just above and below 100 gf and the measurement temperatures by a interpolation method, and then rounded off to the nearest whole number).

The organoleptical assessment was performed by ten panelists. The meltability feeling in the mouth means the melting rate of an oily food material in the oral cavity. Assessment criteria are as follows. +++: excellent, ++: very good, +: good, X: not good. In the present invention, a commercially practicable level is expressed by "+", "++" or "+++", and "X" shows a level which is the same as or lower than that of a conventional oily food material, i.e., it is hard to say that the appearance of the novel function is shown by the level.

Example 1 had heat resistance of 33° C. and better meltability feeling in the mouth. Example 2 and Example 3 also had heat resistance of 33° C. and better meltability feeling in the mouth.

Example 4 had heat resistance of 33° C., and slightly deteriorated meltability feeling in the mouth, but its commercial value was sufficiently recognized.

Comparative Example 1 having the same extent of a particle diameter as that of a conventional oily food material had heat resistance of 33° C. similarly to Examples, but its meltability feeling in the mouth was significantly bad, and its commercial value was low.

Example 5, Example 6, Example 7, Example 8, Comparative Example 2

Using powdered sugar, a test fat material, strawberry powder and lecithin according to the blending ratio shown in Table 1, an oily food material was produced by the following method. The produced oily food material was subjected to a tempering procedure. After tempering, the oily food material was molded and cooled to be solidified.

(Production Method)

A part of the test fat melted at 60° C. in such an amount that the oil content of a mixture became 24% was blended with 60 parts of powdered sugar (particle size: 70 to 150 μm) and 1 part of strawberry powder. The mixture was warmed, kneaded, and milled under such a condition that the particle diameter became 70 μm with a roll refiner ("Three-roll mill SDY-300" manufactured by BUHLER) to obtain rolled flakes. The all remaining amount of the test fat and the rolled flakes were kneaded with a conching machine (conche) while warming.

TABLE 4

|  | Example 5 | Example 6 | Example 7 | Example 8 | Comparative Example 2 |
|---|---|---|---|---|---|
| <Test fat blending ratio> | | | | | |
| SS400 | 100 | 75 | 50 | 25 | 0 |
| Cocoa butter | 0 | 25 | 50 | 75 | 100 |
| Particle diameter | 70 | 70 | 69 | 72 | 71 |
| SOS content | 64.2 | 54.6 | 45.0 | 35.3 | 25.7 |
| <Physical property assessment> | | | | | |
| Heat resistance (° C.) | 33 | 32 | 32 | 31 | 30 |
| <Organoleptical assessment> | | | | | |
| Meltability feeling in the mouth | +++ | +++ | +++ | +++ | +++ |

For assessing physical property, a sample was aged at 20° C. about for 7 days after cooling, allowed to stand for 2 hours at each temperature, and then measured with RHEO METER (NRM-2003J manufactured by Fudo Kogyo; plunger diameter: 3 mm). The temperature at which a measured value was around 100 gf was regarded as a criterion for heat resistance, and the indication thereof was used as an index of heat resistance (provided that since the measurement was performed at intervals of one degree, the index was presumed from indications just above and below 100 gf and the measurement temperatures by a interpolation method, and then rounded off to the nearest whole number).

The organoleptical assessment was performed by ten panelists. The meltability feeling in the mouth means the melting rate of an oily food material in the oral cavity. Assessment criteria are as follows. +++: excellent, ++: very good, +: good, X: not good. In the present invention, a commercially practicable level is expressed by "+", "++" or "+++", and "X" shows a level which is the same as or lower than that of a conventional oily food material, i.e., it is hard to say that the appearance of the novel function is shown by the level.

Example 5 had heat resistance of 33° C. and better meltability feeling in the mouth. Example 6 and Example 7 also had heat resistance of 32° C. and better meltability feeling in the mouth.

Example 8 had heat resistance of 31° C., but had much better meltability feeling in the mouth.

Comparative Example 1 which was produced using only cocoa butter as a fat ingredient had much better meltability feeling in the mouth, but its heat resistance was 30° C., which was the same as that of a conventional oily food material and was not particularly excellent.

Example 9, Example 10, Example 7, Example 8, Comparative Example 3

Using cocoa mass, cocoa powder, powdered sugar, a test fat and lecithin according to the blending ratio shown in Table 5, an oily food material was produced by the following method. The produced oily food material was subjected to a tempering procedure. After tempering, the oily food material was molded and cooled to be solidified.
(Production Method)
In Example 9, Example 10 and Comparative Example 3, a part of the test fat melted at 60° C. in such an amount that the oil content of a mixture became 24% was blended with 5 parts of cocoa mass, 15 parts of cocoa powder and 45 parts of powdered sugar (particle size: 70 to 150 µm). The mixture was warmed, kneaded, and milled under such a condition that the particle diameter became 70 µm in Example 9, 30 µm in Example 10 or 20 µm in Comparative Example 3 with a roll refiner ("Three-roll mill SDY-300" manufactured by BUHLER) to obtain rolled flakes. The all remaining amount of the test fat and the rolled flakes were kneaded with a conching machine (conche) while warming to obtain an oily food material.

TABLE 5

| Cocoa mass | 5 parts |
|---|---|
| Cocoa powder | 15 parts |
| Powdered sugar | 45 parts |
| Test fat | 35 parts |
| Lecithin | 0.4 parts |

Physical property assessment and organoleptical assessment are shown in Table 6.

TABLE 6

|  | Example 9 | Example 10 | Comparative Example 3 |
|---|---|---|---|
| Particle diameter | 71.2 | 32.7 | 20.5 |
| SOS content | 64.2 | 64.2 | 64.2 |
| <Physical property assessment> | | | |
| Heat resistance (° C.) | 33 | 33 | 33 |
| <Organoleptical assessment> | | | |
| Meltabilty feeling in the mouth | +++ | ++ | X |

For assessing physical property, a sample was aged at 20° C. about for 7 days after cooling, allowed to stand for 2 hours at each temperature, and then measured with RHEO METER (NRM-2003J manufactured by Fudo Kogyo; plunger diameter: 3 mm). The temperature at which a measured value was around 100 gf was regarded as a criterion for heat resistance, and the indication thereof was used as an index of heat resistance (provided that since the measurement was performed at intervals of one degree, the index was presumed from indications just above and below 100 gf and the measurement temperatures by a interpolation method, and then rounded off to the nearest whole number).

The organoleptical assessment was performed by ten panelists. The meltability feeling in the mouth means the melting rate of an oily food material in the oral cavity. Assessment criteria are as follows. +++: excellent, ++: very good, +: good, X: not good. In the present invention, a commercially practicable level is expressed by "+", "++" or "+++", and "X" shows a level which is the same as or lower than that of a conventional oily food material, i.e., it is hard to say that the appearance of the novel function is shown by the level.

Example 9 and Example 10 had heat resistance of 33° C. and better meltability feeling in the mouth. Comparative Example 3 having the same extent of a particle diameter as that of a conventional oily food material had heat resistance of 33° C. similarly to Examples 9 and 10, but its meltability feeling in the mouth was significantly bad, and its commercial value was low.

Comparative Example A, Example 11, Example 12, Example 13, Example 14, Comparative Example 5

Using powdered sugar, a test fat material, strawberry powder and lecithin according to the blending ratio shown in Table 7, an oily food material was produced by the following method. The produced oily food material was subjected to a tempering procedure. After tempering, the oily food material was molded and cooled to be solidified.

(Production Method)

The test fat melted at 60° C. was blended with powdered sugar (particle size: 70 to 150 μm) and strawberry powder, and then kneaded with a conching machine (conche) while warming.

Physical property assessment and organoleptical assessment are shown in Table 7.

TABLE 7

|  | Comparative Example 4 | Example 11 | Example 12 | Example 13 | Example 14 | Comparative Example 5 |
|---|---|---|---|---|---|---|
| Powdered sugar | 85 parts | 80 parts | 70 parts | 50 parts | 45 parts | 40 parts |
| Test fat | 15 parts | 20 parts | 30 parts | 50 parts | 55 parts | 60 parts |
| Strawberry powder | 1 part | 1 part | 1 parts | 1 part | 1 part | 1 part |
| Lecithin | 0.4 parts | 0.4 parts | 0.4 parts | 0.4 parts | 0.4 parts | 0.4 parts |
| Particle diameter (μm) | 70 | 71 | 69 | 70 | 71 | 70 |
| SOS content (%) | 64.2 | 64.2 | 64.2 | 64.2 | 64.2 | 64.2 |
| <Physical property assessment> | | | | | | |
| Heat resistance (° C.) | — | 33 | 33 | 33 | 33 | 33 |
| <Organoleptical assessment> | | | | | | |
| Meltability feeling in the mouth | — | +++ | +++ | ++ | + | X |

The all particle diameters are substantially the same because the same powdered sugar is used in all the cases and the particle diameter is not changed by roll refining. Although powdered sugar having a particle size of 70 to 150 μm is used, Table 7 shows values obtained by measuring the particle diameters of the oily foods obtained in respective Examples by the method of measuring the particle diameter of an oily food material used in the present invention.

For assessing physical property, a sample was aged at 20° C. about for 7 days after cooling, allowed to stand for 2 hours at each temperature, and then measured with RHEO METER (NRM-2003J manufactured by Fudo Kogyo; plunger diameter: 3 mm). The temperature at which a measured value was around 100 gf was regarded as a criterion for heat resistance, and the indication thereof was used as an index of heat resistance (provided that since the measurement was performed at intervals of one degree, the index was presumed from indications just above and below 100 gf and the measurement temperatures by a interpolation method, and then rounded off to the nearest whole number).

The organoleptical assessment was performed by ten panelists. The meltability feeling in the mouth means the melting rate of an oily food material in the oral cavity. Assessment criteria are as follows. +++: excellent, ++: very good, +: good, X: not good. In the present invention, a commercially practicable level is expressed by "+", "++" or "+++", and "X" shows a level which is the same as or lower than that of a conventional oily food material, i.e., it is hard to say that the appearance of the novel function is shown by the level.

Example 11, Example 12 and Example 13 had heat resistance of 33° C. and better meltability feeling in the mouth. Example 14 had heat resistance of 33° C. and slightly deteriorated meltability feeling in the mouth, but its commercial value was sufficiently recognized.

Further, Comparative Example 5 having an increased oil content also had heat resistance of 33° C., but its meltability feeling in the mouth was significantly bad, and its commercial value was low.

In Comparative Example 4, since the fat content was too small and thereby all solid matter particles could be included in the fat, the ingredients were not held together as an oily food material and therefore the assessment could not be performed.

Industrial Applicability

According to the present invention, an oily food material having a satisfactory and novel texture which conventional oily food materials have never had and having high heat resistance can be produced by an easy method.

The invention claimed is:

1. An oily food comprising a fat and a sugar as the main ingredients, wherein coarse particles of solid matter other than the fat have a particle size of 30 μm or larger, and the proportion of StOSt in the total fat amount contained in the oily food is 40% or more, wherein St is stearic acid and O is oleic acid, and
   wherein the oily food is chocolate or glaze.

2. The oily food according to claim 1, which contains the fat in an amount of 20% to 55% of the oily food.

3. The oily food according to claim 2, wherein the oily food is finished chocolate product.

4. The oily food according to claim 3, wherein the solid matter other than the fat is at least one solid matter selected from the group consisting of sugar, whole milk powder, skim milk powder, cream powder, whey powder, butter milk powder, cocoa mass, cocoa powder, adjusted cocoa powder, cheese powder, coffee powder and fruit juice powder.

5. The oily food according to claim 3, wherein the coarse particles of solid matter other than fat have a particle size of 55 μm or larger.

6. The oily food according to claim 3, wherein the coarse particles of solid matter other than fat have a particle size of 70 μm or larger.

7. The oily food according to claim 6, wherein the proportion of StOSt in the total fat amount contained in the oily food is 45% or more.

8. The oily food according to claim 6, wherein the proportion of StOSt in the total fat amount contained in the oily food is 64.2% or more.

9. The oily food according to claim 8, which contains the fat in an amount of 20% to 50% of the oily food.

10. The oily food according to claim 8, which contains the fat in an amount of 20% to 30% of the oily food.

11. The oily food according to claim 2, wherein the solid matter other than the fat is at least one solid matter selected from the group consisting of sugar, whole milk powder, skim milk powder, cream powder, whey powder, butter milk powder, cocoa mass, cocoa powder, adjusted cocoa powder, cheese powder, coffee powder and fruit juice powder.

12. The oily food according to claim 2, wherein the coarse particles of solid matter other than fat have a particle size of 55 μm or larger.

13. The oily food according to claim 1, wherein the solid matter other than the fat is at least one solid matter selected from the group consisting of sugar, whole milk powder, skim milk powder, cream powder, whey powder, butter milk powder, cocoa mass, cocoa powder, adjusted cocoa powder, cheese powder, coffee powder and fruit juice powder.

14. The oily food according to claim 1, wherein the coarse particles of solid matter other than fat have a particle size of 55 μm or larger.

15. The oily food according to claim 1, wherein the oily food is finished chocolate product.

16. The oily food according to claim 15, wherein the solid matter other than the fat is at least one solid matter selected from the group consisting of sugar, whole milk powder, skim milk powder, cream powder, whey powder, butter milk powder, cocoa mass, cocoa powder, adjusted cocoa powder, cheese powder, coffee powder and fruit juice powder.

17. The oily food according to claim 15, wherein the coarse particles of solid matter other than fat have a particle size of 55 μm or larger.

* * * * *